United States Patent
Zhang

(10) Patent No.: US 12,212,197 B2
(45) Date of Patent: Jan. 28, 2025

(54) VARNISH INJECTOR FOR MOTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 17/954,799

(22) Filed: Sep. 28, 2022

(65) Prior Publication Data
US 2024/0106310 A1   Mar. 28, 2024

(51) Int. Cl.
*H02K 15/12*   (2006.01)

(52) U.S. Cl.
CPC .................. *H02K 15/12* (2013.01)

(58) Field of Classification Search
CPC ........................................ H02K 15/12
See application file for complete search history.

(56) References Cited

U.S. PATENT DOCUMENTS

| | | | |
|---|---|---|---|
| 10,063,118 B2 | 8/2018 | Yoshida et al. | |
| 10,658,884 B2 | 5/2020 | Honjo | |
| 2017/0110916 A1 | 4/2017 | Matsumoto | |
| 2021/0183535 A1* | 6/2021 | Natori | H01B 3/421 |
| 2022/0094248 A1 | 3/2022 | Kobayashi et al. | |

* cited by examiner

*Primary Examiner* — Robert S Walters, Jr.
(74) *Attorney, Agent, or Firm* — Burris Law, PLLC

(57) ABSTRACT

A method for applying varnish to an electric motor includes locating a varnish injector above a slot of a stator of the electric motor, depressing an intermediate layer in the slot with the varnish injector, and applying varnish from the varnish injector into a gap defined between the intermediate layer and a wall of the slot.

12 Claims, 7 Drawing Sheets

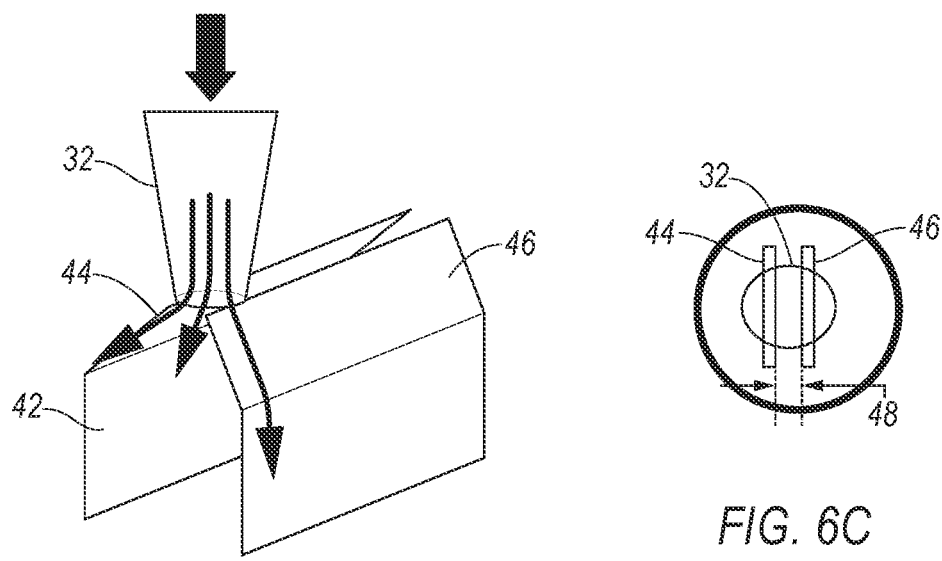
FIG. 6B
FIG. 6C
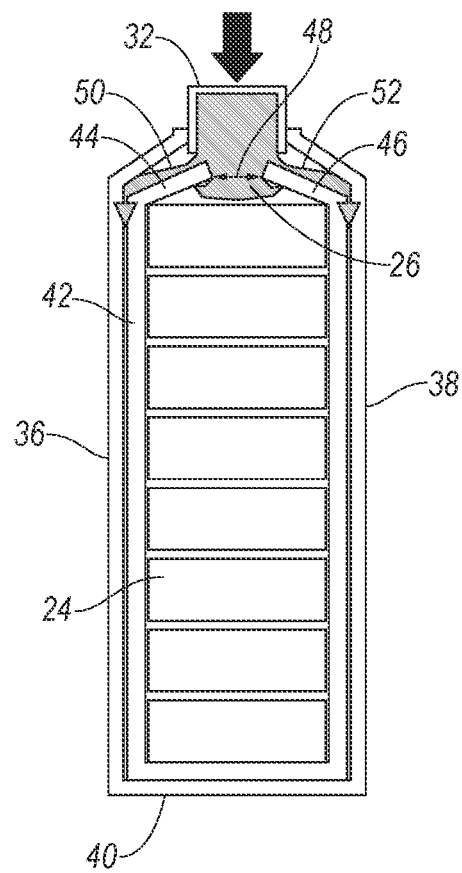
FIG. 6A

VARNISH INJECTOR FOR MOTOR

FIELD

The present disclosure relates to electric motors, and more particularly to maintenance of electric motor components.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant, thereby improving an operation life of the electric propulsion system. The varnish can be applied with a machine designed to apply the varnish to the various components of the motors. During application, varnish may flow away from an intended location or component that uses the varnish, increasing the total amount of varnish used and potentially disrupting operation of other parts of the electric motor.

The present disclosure addresses challenges related to varnish application to electric motors.

SUMMARY

This section provides a general summary of the disclosure and is not a comprehensive disclosure of its full scope or all of its features.

In one form, a method for applying varnish to an electric motor includes locating a varnish injector above a slot of a stator of the electric motor, depressing an intermediate layer in the slot with the varnish injector, and applying varnish from the varnish injector into a gap defined between the intermediate layer and a wall of the slot.

In variations of the method, which may be implemented individually or in combination: the method further includes moving the varnish injector in an axial direction along the slot to apply the varnish; applying varnish from the varnish injector into a second gap defined between the intermediate layer and a wire disposed in the slot; applying varnish through the space onto a wire disposed in the slot; removing the varnish injector from the slot, rotating the stator, and locating the varnish injector above a second slot; moving the varnish injector in a first axial direction along the slot and moving the varnish injector in an opposing axial direction along the second slot; inputting a model of the stator to a controller configured to move the varnish injector and locating the injector above the slot according to the input model; the intermediate layer includes a first edge and a second edge, the method further including depressing the first and second edges; the first edge and the second edge define a space therebetween, the method further including depressing the first and second edges to decrease a width of the space; the slot is defined in the stator by an outer wall and a bottom, the intermediate layer extends along the outer wall and the bottom, and the method further including injecting varnish through the gap to the bottom; the controller is further configured to rotate the stator by a specified angle to align a second slot below the varnish injector; the specified angle is based on a total number of slots of the stator.

A varnish injection system for an electric motor includes an arm, a varnish injector supported by the arm, and a controller configured to move the arm and the varnish injector according to a three-dimensional model of the electric motor to apply varnish to the electric motor.

In variations of the system, which may be implemented individually or in combination: the controller is further configured to move the arm in an axial direction along a slot of a stator of the electric motor according to the model; the controller is further configured to move the varnish injector in a radial direction into a slot of a stator of the electric motor according to the model; the controller is further configured to move the varnish injector to depress an intermediate layer in the slot according to the model; the controller is further configured to locate the varnish injector above a slot of a stator of the electric motor according to the model; the controller is further configured to move the arm and the varnish injector in an axial direction along the slot according to the model; the controller is further configured to remove the varnish injector from the slot, to rotate the electric motor by a specified angle, and to locate the varnish injector in a second slot according to the model; the controller is configured with a respective three-dimensional model for each of a plurality of electric motors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6A is a cross-sectional view of one of the slots of the stator core with varnish applied by the varnish injector according to the present disclosure;

FIG. 6B is a view of the varnish injector disposed on an intermediate layer disposed in the slot of FIG. 6A according to the present disclosure;

FIG. 6C is a view of the varnish injector depressing the intermediate layer of FIG. 6B according to the present disclosure.

Figure 1:
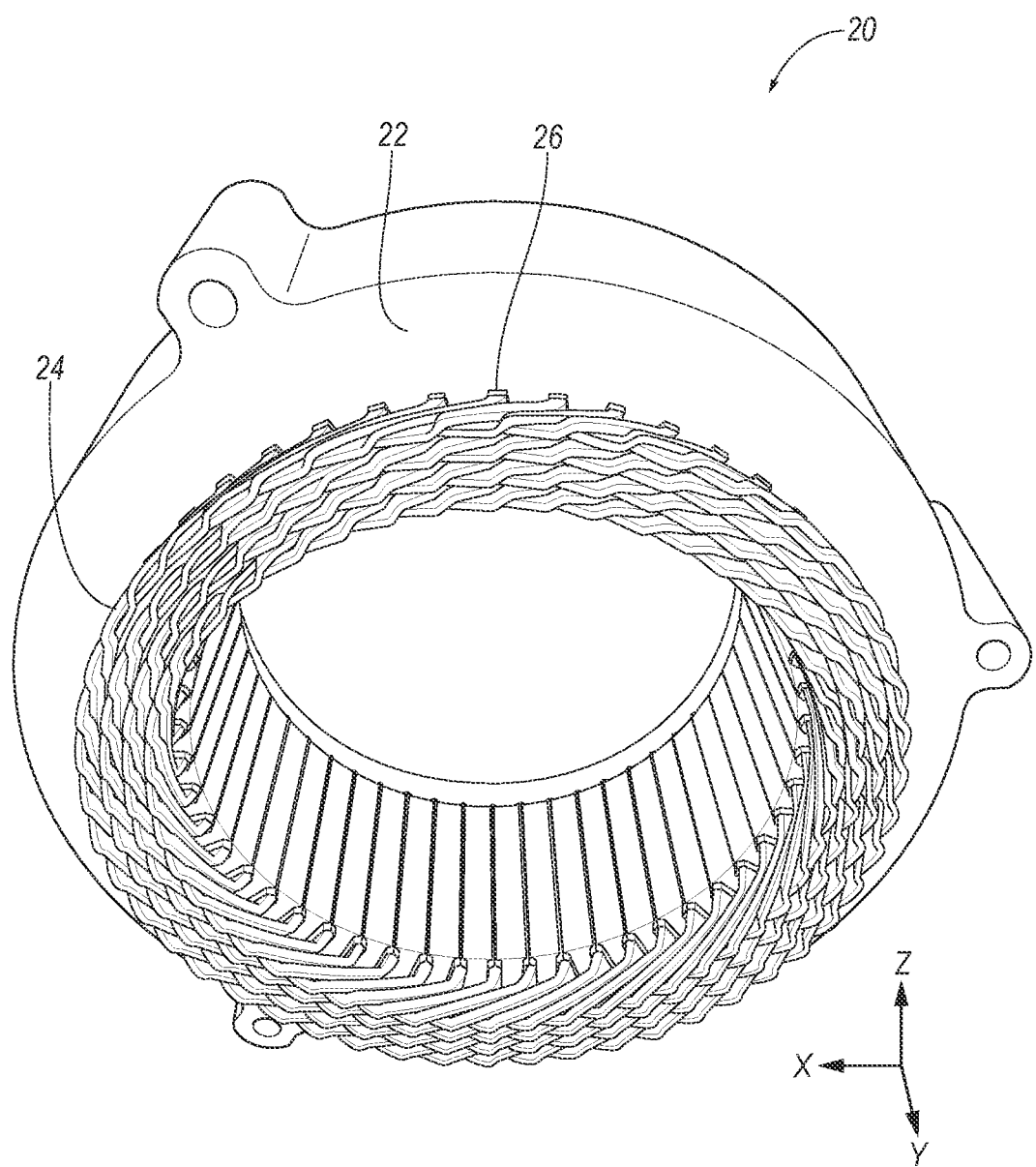
FIG. 1 is a perspective view of a stator of an electric motor according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. In one form, the electric motor is provided as a component of an electric propulsion system for a motor vehicle. The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

Figure 2:
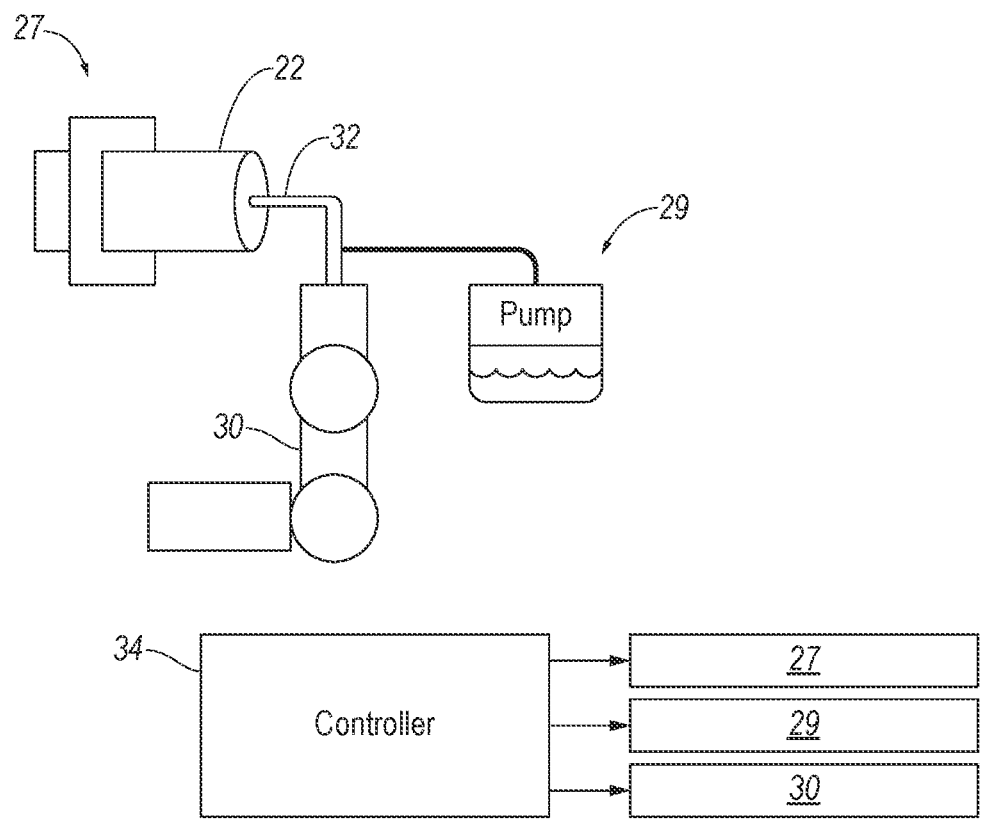
FIG. 2 is a view of a varnish injection system for the electric motor according to the present disclosure.

With reference to FIGS. 1-2, an example of a stator 20 for an electric motor is illustrated and includes a stator core 22 and a plurality of wires 24. In one form, the stator core 22 defines a plurality of slots 26, and each slot 26 includes one or more wires 24 from among the plurality of wires 24. With continuing reference to FIG. 1, the wires 24 are formed of an electrically conducting material such as copper. With the wires 24 arranged in the slots 26, electric current flowing through the wires 24 generates an electromagnetic field that drives the rotor.

To inhibit corrosion or deterioration of electrical properties of the wires 24, a varnish (not shown) is applied to the stator during assembly of the electric motor. The varnish is typically applied to an outermost surface of the stator core 22, and capillary action directs the flow of the varnish through the slot 26 and onto the wires 24 in the slot 26. Specifically, the varnish flows through narrow spaces (i.e., capillaries) such as the slot 26 by adhesion, viscosity, and/or surface tension with the slot 26 without significant influence by, or even against, the force of gravity. The stator core 22 is rotated in a fixture 27, as shown in FIG. 2, such that a varnish injector applying the varnish can inject the varnish to each of the slots 26 and the wires 24 therein.

More particularly, in an example application, a varnish injection system 28 provides the varnish to the stator core 22. The varnish injection system 28 includes the fixture 27, a varnish supply 29, an arm 30, a varnish injector 32 supported by the arm 30, and a controller 34 configured to control the fixture 27 to rotate the stator core 22, the arm 30, and the varnish injector 32. In an example application, the arm 30 is movable in three dimensions, shown in FIG. 1 as x-y-z rectangular coordinates. The varnish injector 32 moves with the arm 30 in three dimensions, depositing varnish onto the wires 24 in the slots 26 of the stator core 22. The arm 30 and the varnish injector 32 are movable by a suitable mechanism, such as a linear actuator or a robotic arm, that moves the arm 30 to position the varnish injector 32 at specified three-dimensional locations to provide varnish to the stator core 22.

Figure 3:
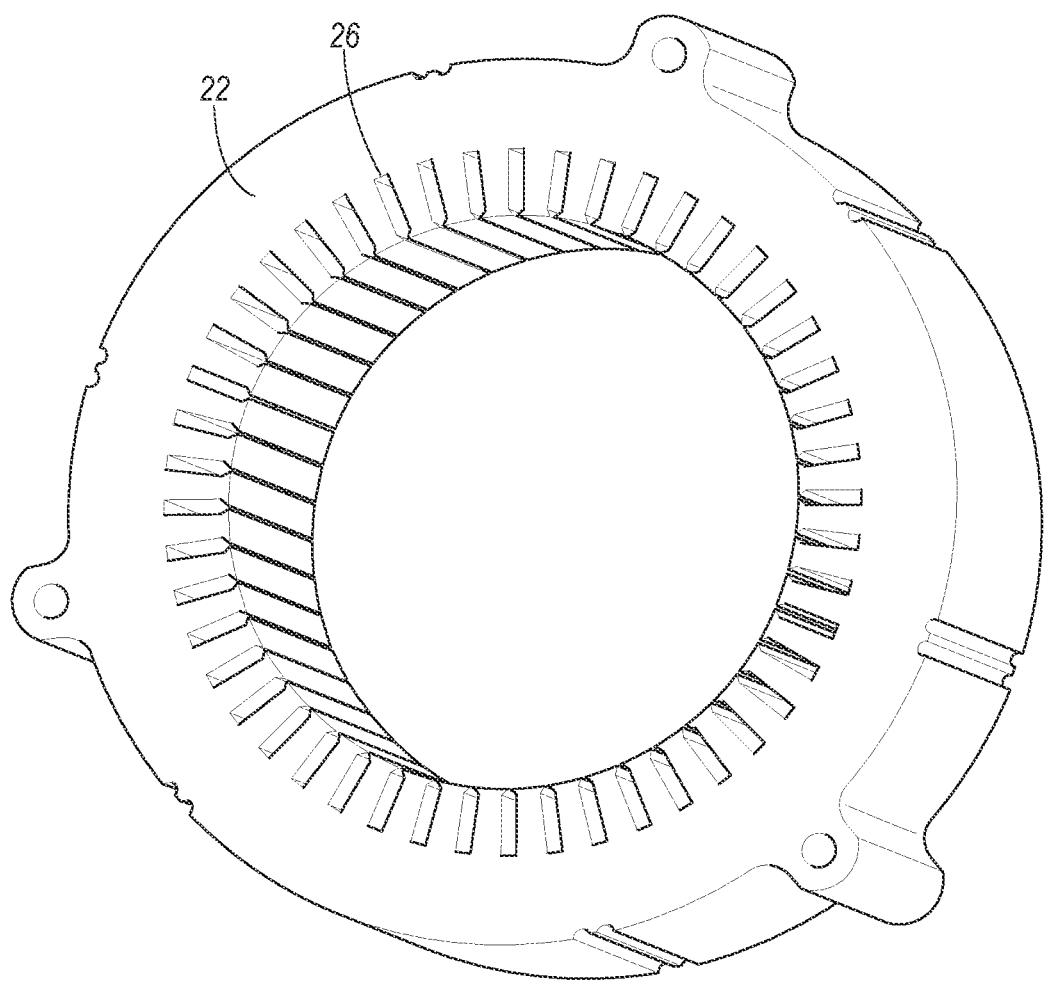
FIG. 3 is a model of a stator core of the stator according to the present disclosure.

With reference to FIG. 3, the stator core 22 is represented as a three-dimensional model. In this context, a "three-dimensional model" is a representation of the stator core 22 as a set of three-dimensional spatial coordinates, such as is used in computer-aided design (CAD) or finite element analysis (FEA) programs. The model defines the slots 26 in which the wires 24 are located. The controller 34 is configured to move the arm 30 and the varnish injector 32 according to the three-dimensional model to apply the varnish to the stator core 22. In one form, as described further below, the controller 34 is configured to move the arm 30 to the coordinates defined by one of the slots 26 to locate the varnish injector above the slot 26. The varnish injector 32 is configured to apply varnish to the slot 26, and then the arm 30 is configured to move along specified three-dimensional coordinates to move the varnish injector 32 along the slot 26 in an axial direction. In one form, the three-dimensional model is input to the controller 34 and stored in a memory. The controller 34 includes respective three-dimensional models for a plurality of stators 22 of different sizes and configurations.

Figure 4A:
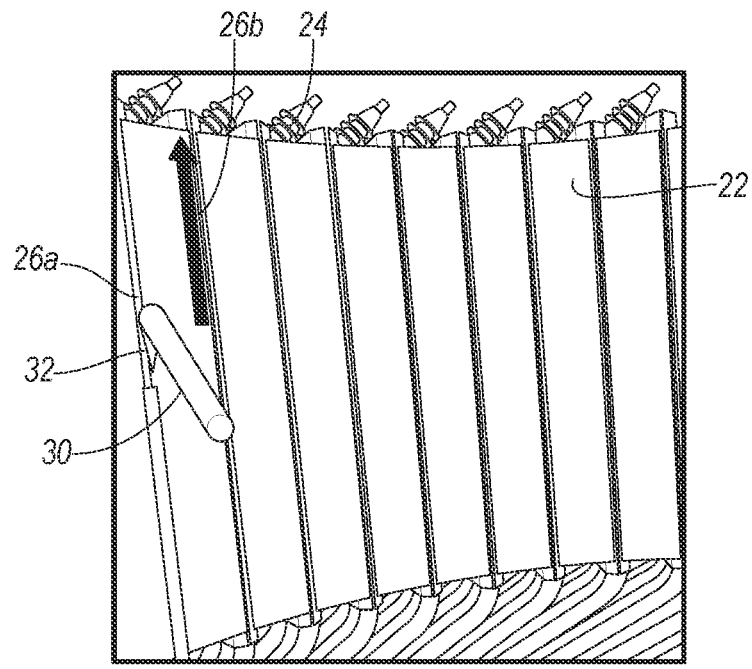
FIGS. 4A-4B are views of a varnish injector applying varnish to slots of the stator core according to the present disclosure.
Figure 4B:
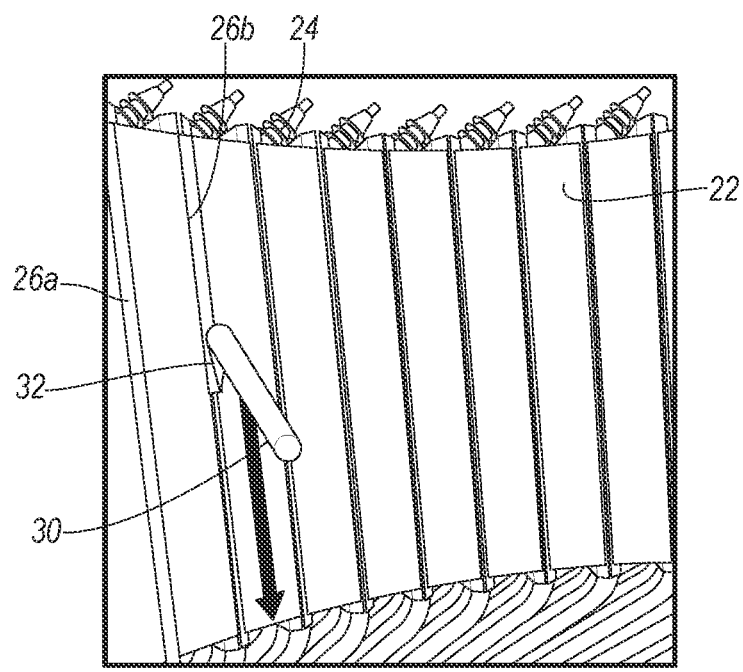

With reference to FIGS. 4A and 4B, the controller 34 is configured to move the arm 30 in an axial direction along the slots 26 of the stator core 22. The controller 34 moves the arm 30 in the axial direction along a first slot 26a, applying varnish to the wires 24 in the slot 26a with the varnish injector 32 as shown in FIG. 4A. Then, the stator core 22 is rotated by the fixture by a specified angle to align a second slot 26b with the varnish injector 32, where the specified angle is determined based on a total number of slots 26 of the stator core 22. Then, the controller 34 moves the arm 30 in an opposing axial direction along the second slot 26b, applying varnish to the wires 24 in the second slot 26b with the varnish injector 32 as shown in FIG. 4B. The stator core 22 is then rotated to align another slot 26 with the arm 30, not shown in the figures, and the controller 34 continues to apply varnish in each slot 26 of the stator core 22 with the arm 30 and the varnish injector 32. The varnish injection system 28 continues to rotate the stator core 22 until a number of slots 26 that have received varnish equals a total number of slots 26 of the stator core 22, as determined by the three-dimensional model. The three-dimensional model defines the locations of the slots 26 and the angles at which the stator core 22 rotates to align the arm 30 with the slots 26.

Figure 5B:
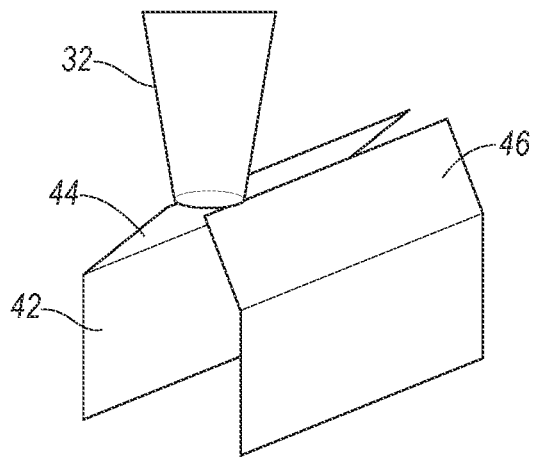
FIG. 5B is a view of the varnish injector disposed on an intermediate layer disposed in the slot of FIG. 5A according to the present disclosure.
Figure 5C:
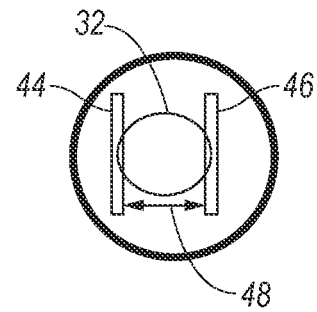
FIG. 5C is a view of the varnish injector contacting the intermediate layer of FIG. 5B according to the present disclosure.
Figure 5A:
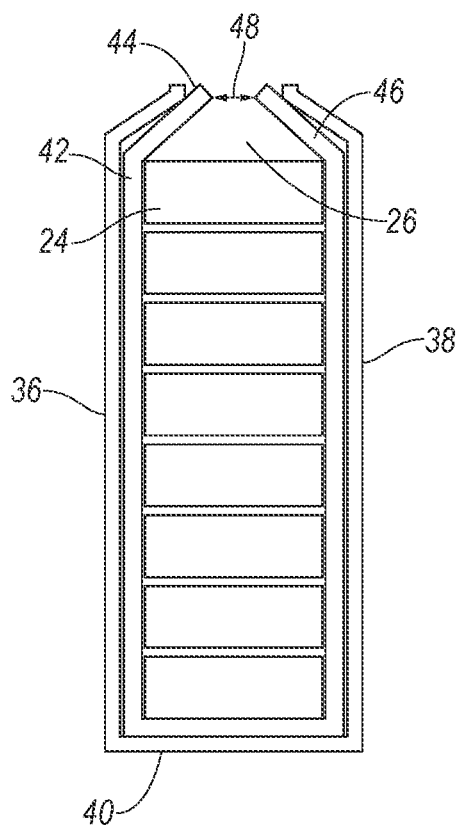
FIG. 5A is a cross-sectional view of one of the slots of the stator core with wires disposed therein according to the present disclosure.

Referring now to FIGS. 5A-5C, a magnified view of one of the slots 26 is shown. As shown in FIG. 5A, the slot 26 includes a first outer wall 36, a second outer wall 38, and a bottom 40 extending between the outer walls 36, 38. An intermediate layer 42 is disposed in the slot 26 between the wires 24 and the outer walls 36, 38 and the bottom 40 of the slot 26. The intermediate layer 42 provides electrical insulation between the wires 24 and the walls 36, 38. In this form, the intermediate layer 42 is paper or another porous and/or fibrous material that absorbs and transmits the varnish through fibers of the paper. The intermediate layer 42 includes a first edge 44 contacting one of the outer walls 36, 38 and a second edge 46 contacting the other of the outer walls 36, 38. As shown in FIG. 5C, the first and second edges 44, 46 define a space 48 therebetween.

As shown in FIG. 5B, the arm 30 is configured to locate the varnish injector 32 onto the intermediate layer 42. In this context, to "locate" the varnish injector 32 means to move the varnish injector 32 to specified three-dimensional coordinates. In this form, the controller 34 locates the varnish injector 32 above the slot 26 according to the model such that the varnish injector 32 is above the space 48 (shown in FIG. 5C) between the first and second edges 44, 46 of the intermediate layer 42.

With reference to FIGS. 6A-6C, the varnish injector 32 depresses the intermediate layer 42 and applies varnish into gaps 50, 52 defined between the intermediate layer 42 and the walls 36, 38 of the slot 26. As described above, the intermediate layer 42 includes the first and second edges 44, 46, and the controller 34 is configured to move the varnish injector 32 to depress the first and second edges 44, 46. As shown in FIG. 6C, the space 48 between the first and second edges 44, 46 decreases in width as the varnish injector 32 depresses the first and second edges 44, 46 toward each other. The varnish injector 32 injects varnish through the space 48 onto wires 24 disposed in the slot 26, as shown in FIG. 5A.

Depressing the first and second edges 44, 46 of the intermediate layer 42 away from the outer walls 36, 38 of the slot 26 opens gaps 50, 52 into which varnish is applied, as shown in FIGS. 6A-6B. The first edge 44 defines a first gap 50 with the first outer wall 36, and the second edge 46 defines a second gap 52 with the second outer wall 38. Varnish flows through the first and second gaps 50, 52 to the bottom 40 of the slot 26. As the varnish injector 32 moves in the axial direction shown in FIGS. 4A-4B, the varnish injector 32 depresses the intermediate layer 42 along the slot 26, forming the gaps 50, 52 and injects varnish therethrough. Thus, injection of varnish into the slot 26 between the outer walls 36, 38, the bottom 40, and the intermediate layer 42 is improved because the intermediate layer 42 is depressed away from the outer walls 36, 38 and varnish is injected into the slot 26 through the gaps 50, 52 that would not have been present without depressing the intermediate layer 42. That is, varnish application along the slot 26 is improved compared to a conventional injection process because the gaps 50, 52, direct the varnish along the outer walls 36, 38 to the bottom 40. Further, because the varnish injector 32 travels axially along the slot 26, the varnish flows primarily in a radial direction to the bottom 40 rather than in an axial direction along the slot 26. The radial distance to the bottom 40 is shorter than the axial length of the slot 26, and thus a greater percentage of the applied varnish reaches the bottom 40 along this shorter radial distance than varnish would flow by capillary action along the longer axial distance of the slot 26. Accordingly, varnish is more evenly distributed along the axial direction of the slot 26 than the conventional injection process that only applies varnish at the axial ends of the slot 26 and relies on capillary action alone to drive the varnish along the slot 26.

Figure 7:
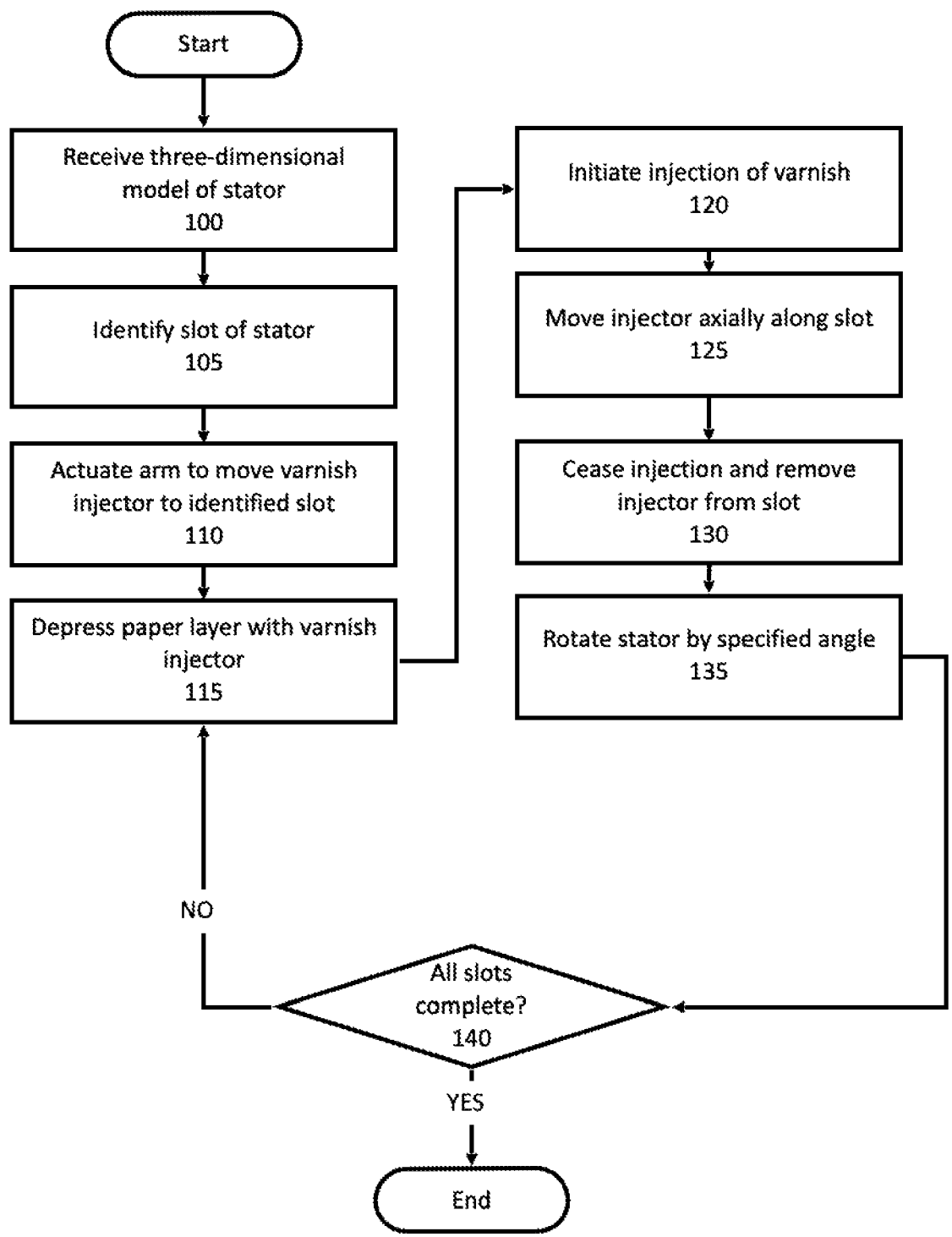
FIG. 7 is a block diagram of a process for applying varnish to a stator of an electric motor according to the present disclosure.

With reference to FIG. 7, a block diagram of an example process implementable by the varnish injection system 28 to apply varnish to the stator 20 is shown. The process begins at 100, in which the controller 34 receives a three-dimensional model of the stator core 22 of the stator 20 from an external source, such as a manufacturer database. As described above, the three-dimensional model is a set of three-dimensional coordinates defining the shape of the stator core 22, such as a CAD or FEA model.

Next, at 105, the controller 34 identifies a slot 26 of the stator core 22 according to the model. The model includes location data to identify the three-dimensional coordinates defining the slots 26 of the stator core 22, and the controller identifies one of the slots 26 to begin varnish injection.

Next, at 110, the controller 34 actuates the arm 30 to move the varnish injector 32 to the identified slot 26. The controller 34 actuates a movement device, such as a jig and/or a linear actuator, to move the arm 30 according to the coordinates defining the slot 26 so that the varnish injector 32 aligns with the slot 26.

Next, at 115, the controller 34 depresses the intermediate layer 42 in the slot 26 with the varnish injector 32. Specifically, the controller 34 actuates the arm 30 to move the varnish injector 32 downward in a radial direction onto the intermediate layer 42, depressing the first and second edges 44, 46 of the intermediate layer 42, forming gaps 50, 52 with the outer walls 36, 38 of the slot 26. The controller 34 determines an amount by which the arm 30 moves the varnish injector 32 radially based on coordinate data of the three-dimensional model of the stator core 22.

Next, at 120, the controller 34 initiates injection of varnish. For example, the controller 34 actuates a pump that provides varnish from a varnish supply to the varnish injector 32. The injected varnish flows through the gaps 50, 52 along the outer walls 36, 38 of the slot 26 to the bottom 40 of the slot 26 and through the space 48 between the edges 44, 46 of the intermediate layer 42 onto the wires 24 disposed in the slot 26.

Next, at 125, the controller 34 actuates the arm 30 to move the varnish injector 32 in an axial direction along the slot 26. The three-dimensional model defines coordinates of the slot 26, and the controller 34 moves the arm 30 according to the coordinates. Accordingly, the varnish injector 32 provides varnish along the axial length of the slot 26.

Next, at 130, upon reaching the end of the slot 26, the controller 34 ceases injection of varnish and removes the varnish injector 32 from the slot 26. The controller 34 actuates the arm 30 to move the varnish injector 32 radially upward from the slot 26 according to the coordinates of the three-dimensional model.

Next, at 135, the controller 34 actuates a fixture 27 holding the stator core 22 to rotate the stator core 22 by a specified angle to align a second slot 26 beneath the varnish injector 32. The specified angle is determined based on the total number of slots 26 defined in, e.g., the three-dimensional model.

Next, at 140, the controller 34 determines whether all of the slots 26 of the stator core 22 have received varnish. Based on the three-dimensional model, the controller 34 determines a number of slots 26 that have received varnish and determines whether the number equals a total number of slots 26 of the stator. When the controller 34 determines that all of the slots 26 of the stator core 22 have received varnish, the process ends. Otherwise, the process returns to 115 to apply varnish to another slot 26.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for applying varnish to an electric motor, the method comprising:
   locating a varnish injector above a slot of a stator of the electric motor;
   depressing an intermediate layer in the slot with the varnish injector; and
   applying varnish from the varnish injector into a gap defined between the intermediate layer and a wall of the slot.

2. The method of claim 1, further comprising moving the varnish injector in an axial direction along the slot to apply the varnish.

3. The method of claim 1, further comprising applying varnish from the varnish injector into a second gap defined between the intermediate layer and a wire disposed in the slot.

4. The method of claim 1, wherein the intermediate layer includes a first edge and a second edge, the method further comprising depressing the first and second edges.

5. The method of claim 4, wherein the first edge and the second edge define a space therebetween, the method further comprising depressing the first and second edges to decrease a width of the space.

6. The method of claim 5, further comprising applying varnish through the space onto a wire disposed in the slot.

7. The method of claim 1, wherein the slot is defined in the stator by an outer wall and a bottom, the intermediate layer extends along the outer wall and the bottom, and the method further comprises injecting varnish through the gap to the bottom.

8. The method of claim 1, further comprising removing the varnish injector from the slot, rotating the stator, and locating the varnish injector above a second slot.

9. The method of claim 8, further comprising moving the varnish injector in a first axial direction along the slot and moving the varnish injector in an opposing axial direction along the second slot.

10. The method of claim 1, further comprising inputting a model of the stator to a controller configured to move the varnish injector and locating the injector above the slot according to the input model.

11. The method of claim 10, wherein the controller is further configured to rotate the stator by a specified angle to align a second slot below the varnish injector.

12. The method of claim 11, wherein the specified angle is based on a total number of slots of the stator.

\* \* \* \* \*